Patented Apr. 6, 1937

2,076,131

UNITED STATES PATENT OFFICE 2,076,131

PROCESS OF MANUFACTURING POLYVINYL DERIVATIVES CONTAINING NITROGEN

Herbert Rein, Leipzig, Germany, assignor to I. G. Farbenindustrie Aktiengesellschaft, Frankfort-on-the-Main, Germany No Drawing. Application August 19, 1935, Serial No. 36,936. In Germany August 21, 1934

3 Claims. (Cl. 260—2)

My present invention relates to the manufacture of polyvinyl derivatives containing nitrogen.

One of its objects is a process for manufacturing polyvinyl derivatives containing nitrogen. Further objects will be seen from the detailed specification following hereafter.

I have found that highly polymeric basic compounds can be obtained which have affinity for acid dyestuffs by the action of a halogen alkylamine, for example bromethylamine $BrC_2H_4NH_2$, or bromethyltrimethylammoniumbromide $$BrCH_2.CH_2N(CH_3)_3Br$$

on a polyvinyl alcoholate. The reaction may be carried out at temperatures between 0 and 100° C., however, the invention is not limited to these temperatures. The products thus obtained have resinous character and do not possess a definite melting point. Their constitution is not known, however it is probable that they are polyvinyl-aminoalkyl ethers, because a metal halide is split off in the reaction. The products thus obtained are useful for imparting to artificial fibers and the like the property of being dyed by means of wool dyestuffs. The compounds may be added to the spinning solution in its preparation or they may be incorporated in the finished fibers.

As an example of the invention 40 grams of polyvinyl alcohol are made into a paste with 200 cc. of caustic soda lye of 20 per cent. strength and, while stirring, 100 grams of bromethylamine hydrobromide are introduced, in the form of powder. The mass gradually becomes more liquid and on heating there is slowly produced a clear solution. After evaporating the solution on the steam-bath methanol is added, whereupon there is produced a white powder freely soluble in water; its nitrogen content is 2.34 per cent.

What I claim is:

1. A process of producing polyvinyl derivatives containing nitrogen which comprises causing a compound selected from the group consisting of halogen alkyl amines and halogen alkyl quaternary ammonium salts to react with a polyvinyl alcoholate.

2. A process of producing polyvinyl derivatives containing nitrogen which comprises causing a compound selected from the group consisting of halogen alkyl amines and halogen alkyl quaternary ammonium salts to react with a polyvinyl alcoholate at a temperature between 0 and 100° C.

3. A process of producing polyvinyl derivatives containing nitrogen which comprises making 40 grams of polyvinyl alcohol into a paste with 200 cc. of a caustic soda solution of 20 per cent strength, adding while stirring 100 grams of bromethylamine hydrobromide, heating the mass until a clear solution is produced, evaporating the solution on the steam-bath, adding methanol, and removing the white powder which is produced.

HERBERT REIN.